(12) United States Patent
Ingles et al.

(10) Patent No.: US 9,366,277 B2
(45) Date of Patent: Jun. 14, 2016

(54) MECHANICAL ASSEMBLIES

(71) Applicant: GE Energy Power Conversion Technology Ltd., Rugby, Warwickshire (GB)

(72) Inventors: Martin Richard Ingles, Rugby (GB); Joseph Eugene, Rugby (GB); David John Swaffield, Rugby (GB)

(73) Assignee: GE ENERGY POWER CONVERSION TECHNOLOGY LTD., Warwickshire (GB)

( * ) Notice: Subject to any disclaimer, the term of this patent is extended or adjusted under 35 U.S.C. 154(b) by 393 days.

(21) Appl. No.: 14/036,424

(22) Filed: Sep. 25, 2013

(65) Prior Publication Data

US 2014/0093302 A1 Apr. 3, 2014

(30) Foreign Application Priority Data

Oct. 1, 2012 (EP) ..................................... 12186868

(51) Int. Cl.
*F16B 4/00* (2006.01)
*F16B 39/01* (2006.01)

(52) U.S. Cl.
CPC . *F16B 4/00* (2013.01); *F16B 4/006* (2013.01); *F16B 39/01* (2013.01); *Y10T 403/21* (2015.01)

(58) Field of Classification Search
CPC .......... F16B 4/006; F16B 4/00; B23P 11/025; B23B 31/117; Y10T 403/21; Y10T 403/213; Y10T 403/217; Y10T 403/48
See application file for complete search history.

(56) References Cited

U.S. PATENT DOCUMENTS

| | | | |
|---|---|---|---|
| 3,088,758 A * | 5/1963 | Brown | F16L 23/12 285/187 |
| 3,740,839 A * | 6/1973 | Otte | C22F 1/006 29/447 |
| 3,746,374 A * | 7/1973 | Sedgwick | F16J 15/02 285/187 |
| 4,098,476 A * | 7/1978 | Jutte | F16B 4/004 138/108 |
| 4,491,347 A * | 1/1985 | Gustafson | F16L 59/141 285/353 |
| 5,056,950 A * | 10/1991 | Rateick, Jr. | F16B 7/042 403/24 |
| 5,318,374 A | 6/1994 | Rumberger | |
| 5,620,187 A * | 4/1997 | Jia | F16J 15/0887 277/614 |
| 5,853,198 A * | 12/1998 | Richied | F16L 37/05 285/187 |
| 2008/0231042 A1* | 9/2008 | Brayman | B23P 11/025 285/41 |

FOREIGN PATENT DOCUMENTS

DE 233040 1/1975

OTHER PUBLICATIONS

European Search Report from corresponding EP Application No. 12186868, Dated Feb. 20, 2013.

* cited by examiner

*Primary Examiner* — Daniel Wiley
(74) *Attorney, Agent, or Firm* — GE Global Patent Operation; Catherine J. Toppin

(57) ABSTRACT

A mechanical assembly such as a torque transfer strut for a rotating superconducting machine. The torque transfer strut includes a composite tube having a first end received in a clamping fitting, which may include an end housing or lug, a clamping wedge screwed onto a threaded end housing, and an annular clamping member applying a radial clamping force to the first end of the composite tube at ambient temperature. When cooled, shrinkage of the end housing in the axial direction causes the annular clamping member to maintain or increase radial clamping force, causing the clamping wedge to apply increasing radial force to an inner member deflecting outwardly a plurality of axial fingers. The first end of the composite tube remains clamped between the inner member and an outer member, together defining an annular channel receiving the first end of the composite tube.

15 Claims, 5 Drawing Sheets

MECHANICAL ASSEMBLIES

BACKGROUND OF THE INVENTION

Embodiments of the present invention relate to mechanical assemblies, at least part of which experience low (optionally cryogenic) temperatures in use. The mechanical assemblies can be used as torque transfer struts for a superconducting rotating electrical machine, e.g. a motor or generator.

A torque transfer strut for a superconducting rotating electrical machine can be manufactured by mounting a metal end housing to a mandrel and then winding carbon-fibre fabric or cloth around the end housing and the mandrel to form the component. Often the carbon-fibre fabric or cloth is passed through a resin bath before it is applied. Such a process can be described as a 'wet wound' process.

SUMMARY OF THE INVENTION

According to an embodiment of the present invention, there is provided a mechanical assembly, the mechanical assembly comprises an elongated member having a first end, and a clamping fitting secured to the first end of the elongated member and applying a radial clamping force to the first end of the elongated member when the mechanical assembly is at ambient temperature, wherein the clamping fitting is configured such that when the mechanical assembly is cooled, optionally to a cryogenic temperature, shrinkage of at least part of the clamping fitting in the axial direction due to cooling causes the clamping fitting to substantially maintain or increase the radial clamping force that it applies to the first end of the elongated member.

According to an embodiment, the mechanical assembly can be a torque transfer strut for a superconducting rotating electrical machine. A superconducting rotating electrical machine typically includes a cylindrical rotor mounted to rotate around or within a cooperating stator. The rotor or stator may include a plurality of superconducting field coils mounted on a field coil support structure. The superconducting field coils and the field coil support structure must be kept at cryogenic temperatures (i.e. below the critical temperature at which the coils are superconducting) when operating. In an embodiment, the mounting for the field coil support structure is kept as close to ambient temperature as possible in order to allow the rotor or stator to couple to other equipment or components which operate at ambient temperature. Torque transfer struts can be provided between the field coil support structure and its mounting to allow the transfer of torque and other stresses, and to provide a good thermal barrier therebetween. A torque transfer strut can have a separate clamping fitting at each axial end. In other words, a first clamping fitting can be secured to the first end of the elongated member and a second clamping fitting can be secured to a second end of the elongated member. Typically only part of the torque transfer strut comprising the first end of the elongated member and the first clamping fitting will be cooled during use, the rest of the torque transfer strut, including the second end of the elongated member and the second clamping fitting, will remain at or close to ambient temperature.

In an embodiment, the clamping fitting can include a connector part to allow the mechanical assembly to be connected to another component, e.g. a field coil support structure in the case of a torque transfer tube. If a second clamping fitting is provided at the second end of the elongated member then the connector part of the second clamping fitting can allow the torque transfer strut to be connected to a mounting.

In an embodiment, the clamping fitting is configured to compensate for any reduction in the radial clamping force that would otherwise occur during cooling as component parts with different coefficients of thermal expansion shrink by different amounts. Without such compensation then there is a risk that the connection between the clamping fitting and the first end of the elongated member, which is rigid and secure at or close to ambient temperature, will become loose as the mechanical assembly is cooled. In other words, the clamping fitting can be constructed such that the radial clamping force that is applied to the first end of the elongated member remains substantially constant as the mechanical assembly is cooled so that a rigid and secure connection is maintained between the elongated member and the clamping fitting at both ambient and cryogenic temperatures. The radial clamping force that is applied to the first end of the elongated member can also increase as the mechanical assembly is cooled. In an embodiment, a small reduction in the radial clamping force that is applied to the first end of the elongated member can be acceptable as long as it remains within accepted tolerances.

The elongated member can be a standard composite component, e.g. a tube made of a composite material such as carbon fibre-reinforced plastic (CFRP) or glass-reinforced plastic (GRP). The tube will typically have a substantially circular cross-section at its first end but other non-circular cross-sections are possible. Standard composite tubes of suitable diameter or cross-section can be utilised for convenience. The component parts of the clamping fitting may be specifically shaped and sized to accommodate such standard composite tubes. The composite tube can be completely hollow or have a hollow first end for receiving the clamping fitting. The composite tube can define a linear strut part of a torque transfer strut.

The clamping fitting can include an annular clamping member that more particularly comprises a radially inner member and a radially outer member. The radially inner and outer members are spaced apart in the radial direction to define an annular channel therebetween into which the first end of the elongated member is received in use. The radially inner and outer members can be formed as an integral component. The radially inner member more particularly includes a plurality of circumferentially-spaced axial slots that extend from a base part and which define a plurality of circumferentially-spaced axial fingers. The axial slots may optionally extend the full axial length of the annular coupling member. The annular clamping member applies the radial clamping force to the first end of the elongated member as described in more detail below. The radially inner and outer members can be formed as separate components, and in one alternative arrangement the radially outer member can form part of the end housing or lug (see below). Any reference herein to the annular clamping member therefore refers in some arrangements to the radially inner member only.

The clamping fitting can include an end housing or lug. The connector part that allows the mechanical assembly to be connected to another component can be formed as part of the end housing.

The clamping fitting can include a clamping wedge selectively mounted to a part of the end housing that is positioned radially within the annular clamping member in use. The clamping wedge is sized and shaped to be a contact fit within an open annular end of the radially inner member of the annular clamping member. One or both of the radially outer surface of the clamping wedge and the radially inner surface of the annular clamping member can be angled relative to a longitudinal axis of the mechanical assembly such that the clamping wedge applies a progressively increasing radial force to the radially inner member as the clamping wedge moves in a first axial direction, i.e. towards the base part of the annular clamping member. The clamping wedge can be selectively mounted to the end housing by means of a screw thread. For example, the cylindrical outer surface of a part of the end housing that is positioned within the annular clamping member in use can be provided with an external screw thread and the clamping wedge can be provided with a complementary internal screw thread. The clamping wedge can therefore be screwed onto the end housing until it is positioned appropriately on the screw-threaded part of the end housing.

Relative rotation between the clamping wedge and the annular clamping member can be prevented by at least one radial spline or key member formed on the radially outer surface of the annular clamping member which can be received in one or more of the circumferentially-spaced axial slots in the annular clamping member. Other ways of preventing rotation of the clamping wedge can be utilised. For example, the annular clamping member can be provided with at least one radial spline or key member which can be received in one or more axial channels or slots in the clamping wedge.

The clamping fitting can include means for adjusting the axial position of the annular clamping member relative to the connector part of the end housing. In one arrangement the adjustment means can be one or more bolts that are received in internally screw-threaded openings in the end housing. The openings can be provided in a radially outer flange part of the end housing that is radially aligned with the base part of the annular clamping member. The non-driven end of each bolt is in abutment with the annular clamping member. The bolts prevent further rotation between the end housing and the annular clamping member and can also be used to adjust the overall axial length of the torque transfer strut to meet specified design tolerances. In another arrangement the adjustment means can be a nut—optionally made of stainless steel—that has an internal screw thread and which is screwed onto an externally screw-threaded cylindrical surface of the end housing. The nut is in abutment with the annular clamping member and, like the bolts, can prevent further rotation between the end housing and the annular clamping member and can be used to adjust the overall axial length of the torque transfer strut to meet specified design tolerances.

The components of the clamping fitting can be made of any suitable material. The end housing and the annular clamping member can be made of materials having different coefficients of thermal expansion.

The end housing or lug can be made of metal or metal alloy, e.g. stainless steel or aluminium.

The annular clamping member can be made of metal or metal alloy, e.g. Inconel® or Invar (FeNi36) alloys.

The clamping wedge can be made of metal or metal alloy, e.g. stainless steel, Inconel® or Invar (FeNi36) alloys.

It will be readily appreciated that other materials can be used. More particularly, the coefficient of thermal expansion of the end housing material is greater than that of the annular clamping member material so that the end housing shrinks at a greater rate when the clamping fitting is cooled. The annular clamping wedge is only placed under compression so it may sometimes be made of a material that is less suited to cryogenic temperatures.

When the mechanical assembly is at ambient temperature, the annular clamping member is loosely received on the end housing, optionally with the base part of the annular clamping member being axially aligned with a cylindrical outer part of the end housing. The end housing can therefore optionally include a connector part that defines an axial end of the end housing, a screw-threaded part onto which the clamping wedge is screwed and which has a smallest diameter, a part having a substantially cylindrical outer surface of larger diameter on which the annular clamping member is mounted or received, and one of a radially outer flange part of still larger diameter which is axially outside the annular clamping member or an externally screw-threaded part onto which an adjusting nut is screwed.

The clamping wedge is slidably positioned within the annular clamping member (i.e. with each radial spline or key member received in a corresponding aligned axial slot) and is loosely screwed onto the cylindrical screw-threaded part of the end housing by relative rotation between the annular clamping member and the end housing.

The first end of the elongated member is then received in the annular channel between the radially inner and outer members of the annular clamping member. The first end of the elongated member is more particularly a close tolerance fit in the annular channel so that a relatively small outward deflection of the axial fingers of the radially inner member is sufficient to exert a radial clamping force on the first end of the elongated member.

To apply the radial clamping force to the first end of the elongated member the end housing or lug is rotated relative to the annular clamping member. Rotation of the clamping wedge relative to the annular clamping member is prevented by the radial spline(s) or key member(s) such that the clamping wedge moves along the screw-threaded part of the end housing in a first axial direction, i.e. towards the base part of the annular clamping member. The radial spline(s) or key member(s) slide within the axial slot(s) of the annular clamping member in which each is received. The movement of the clamping wedge in the first axial direction applies a progressively increasing radial force to the radially inner member of the annular clamping wedge with which it is in sliding contact. It will be readily appreciated that the radial force arises because at least one, and more particularly both, of the clamping wedge and the radially inner member have a chamfered or angled facing surface as described above. The axial fingers of the radially inner member are deflected radially outwardly by the clamping wedge and apply a radial clamping force to the first end of the elongated member. In other words, the first end of the elongated member is securely clamped between the radially inner and outer members of the annular clamping member by the radial clamping force such that the clamping fitting is secured to the elongated member.

Relative rotation between the end housing and the annular clamping member is stopped when the desired radial clamping force is applied to the first end of the elongated member by the annular clamping member. Further relative rotation between the end housing and the annular clamping member can be prevented by the bolts, adjustment nut or other adjustment means.

When the mechanical assembly is cooled, e.g. to a cryogenic temperature, then the end housing will shrink. The annular clamping member will also shrink but typically to a lesser extent because it has a lower coefficient of thermal expansion. Under normal circumstances, the different shrinkage rates would reduce the radial clamping force that is applied to the first end of the elongated member by the annular clamping member, thereby compromising the integrity of the mechanical assembly. However, the shrinkage of the end housing in the axial direction causes the clamping wedge to move in the first axial direction relative to the annular clamping member. The clamping wedge will therefore apply an increasing radial force to the radially inner member of the annular clamping member to at least compensate for any reduction in the radial clamping force that is caused by the components of the clamping fitting shrinking at different rates.

According to an embodiment of the present invention, there is provided a method of using a mechanical fitting, the mechanical fitting comprising an elongated member having a first end, and a clamping fitting. The method comprising the steps of when the mechanical assembly is at ambient temperature, selectively adjusting the clamping fitting to apply a radial clamping force to the first end of the elongated member to secure the clamping fitting to the first end of the elongated member, and cooling the mechanical assembly, optionally to a cryogenic temperature, so that shrinkage of at least part of the clamping fitting in the axial direction due to cooling causes the clamping fitting to substantially maintain or increase the radial clamping force that it applies to the first end of the elongated member.

The optional technical features of the mechanical assembly are as described above.

DETAILED DESCRIPTION OF THE INVENTION

Figure 1:
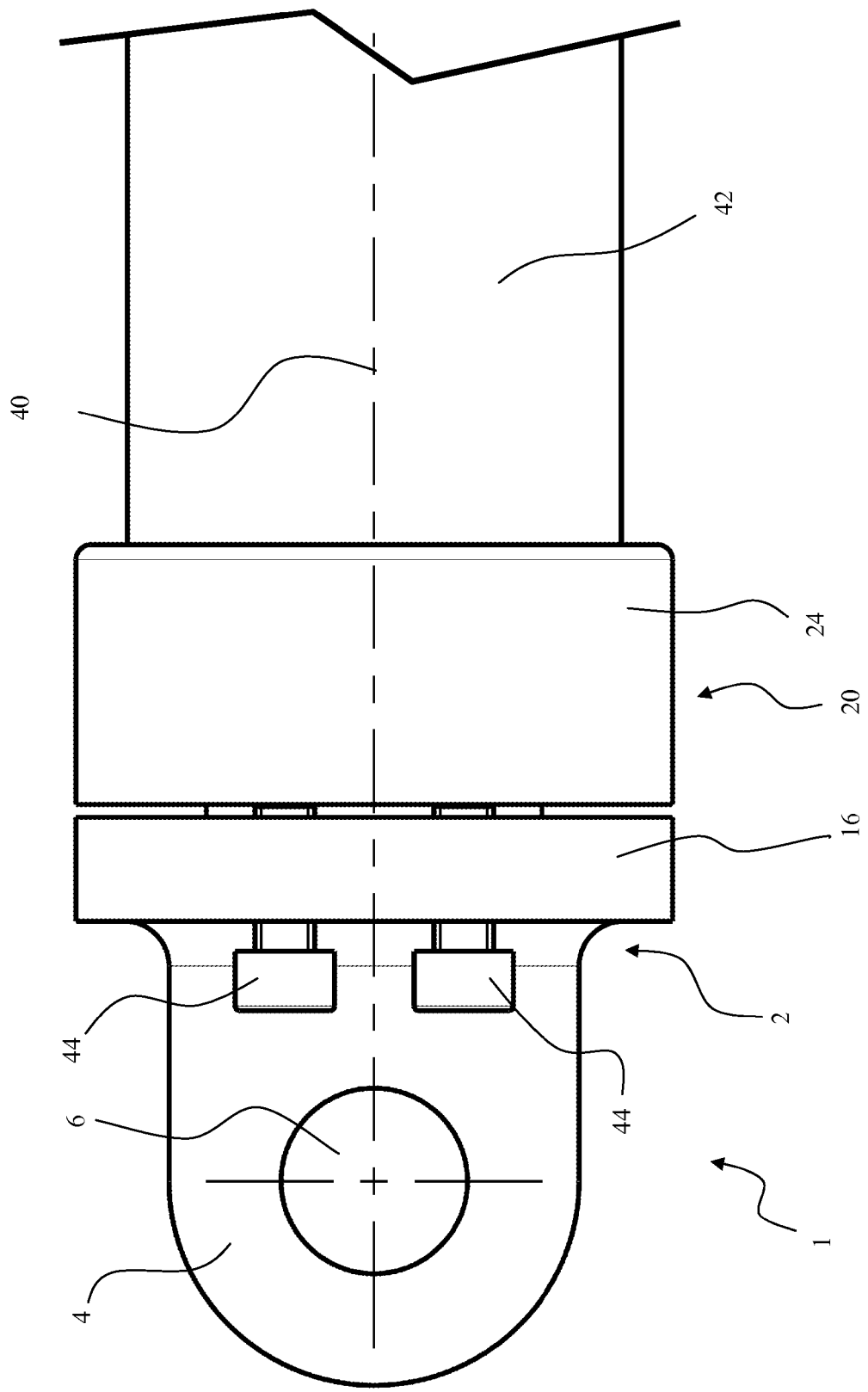
FIG. 1 is a side view of part of a torque transfer strut according to an embodiment of the present invention.

With reference to FIGS. 1 to 4, a torque transfer strut 1 for a superconducting rotating electrical machine includes an end housing or lug 2. The end housing 2 is made of stainless steel and includes a connector part 4 with an opening 6 for connecting the torque transfer strut 1 to a field coil support structure (not shown) that must be kept at a cryogenic temperature when the superconducting rotating electrical machine is operating.

The end housing 2 includes an end part 8 with an externally screw-threaded cylindrical outer surface 10, an intermediate part 12 with a cylindrical outer surface 14, and a radially outer flange part 16.

An annular clamping wedge 18 is made of Inconel® or Invar alloy. The clamping wedge 18 has a complementary internal screw thread and is screwed onto the end part 8 of the end housing 2. The clamping wedge 18 includes a pair of radial splines or key members 18a on its radially outer surface 36.

An annular clamping member 20 is also made of Inconel® or Invar alloy. The annular clamping member 20 includes a radially inner member 22 and a radially outer member 24. The radially inner and outer members 22, 24 are spaced apart in the radial direction to define an annular channel 26 therebetween.

The radially inner member 22 includes six circumferentially-spaced axial slots 31 which extend from a base part 28 of the annular clamping member 20 towards the annular end 30. The axial slots define six circumferentially-spaced axial fingers 32 that can be deflected radially outwardly by the axial movement of the clamping wedge 18 to apply a radial clamping force. The radially inner surface 34 of the radially inner member 22 and the radially outer surface 36 of the clamping wedge 18 are both angled relative to a longitudinal axis 40 of the torque transfer strut 1 to define an inclined sliding contact surface 38 between the annular clamping member 20 and the clamping wedge.

An end of the composite tube 42 is received in the annular channel 26 between the radially inner and outer members 22, 24 of the annular clamping member 20. It will be readily appreciated that only part of the composite tube 42 is shown in FIGS. 1 to 4 and that a separate clamping fitting may be provided at the opposite end to allow the torque transfer strut to be connected to a mounting. A completely different connector or fitting can also be provided at the opposite end.

Figure 2:
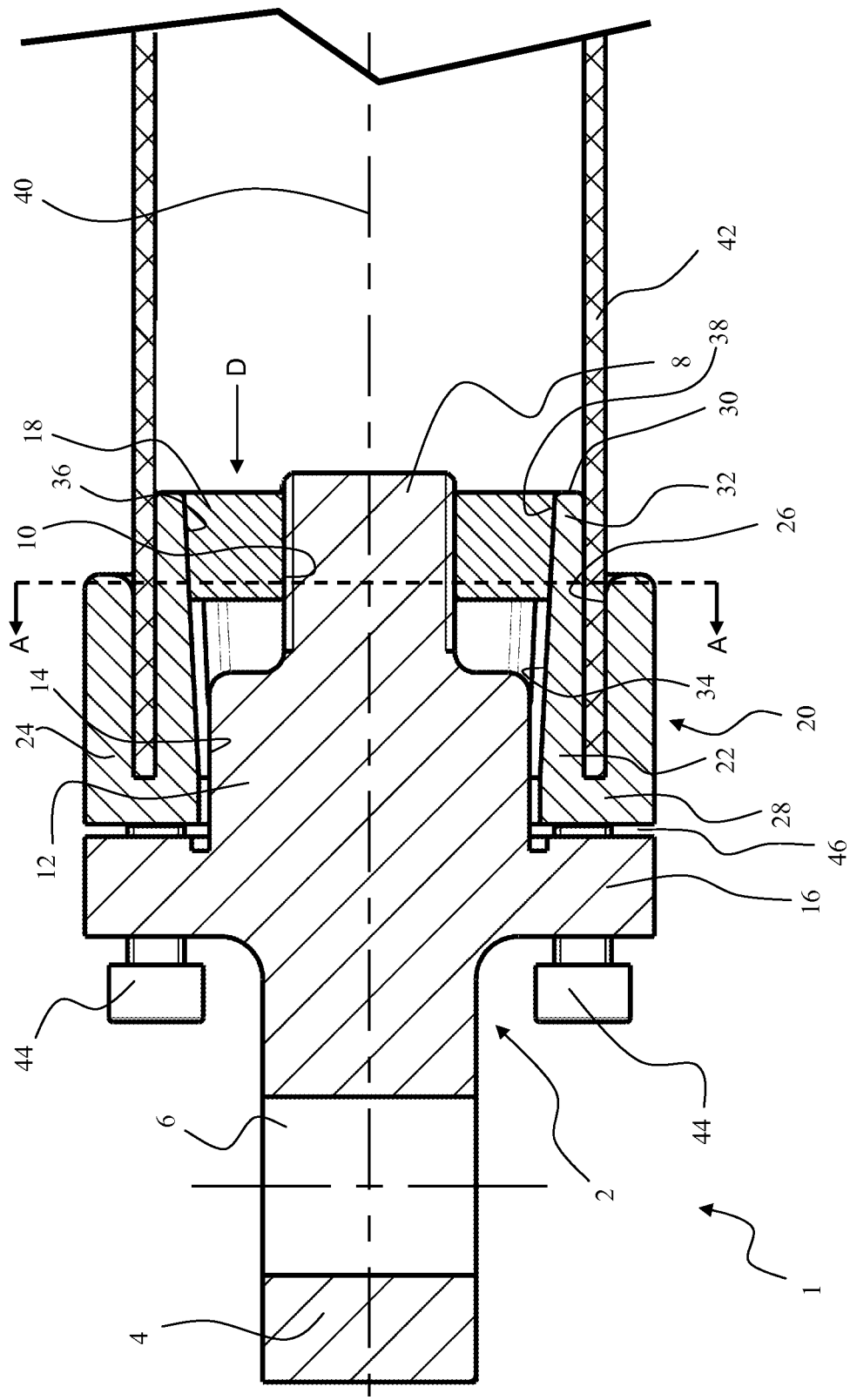
FIG. 2 is a cross section view through the torque transfer strut of FIG. 1.
Figure 3:
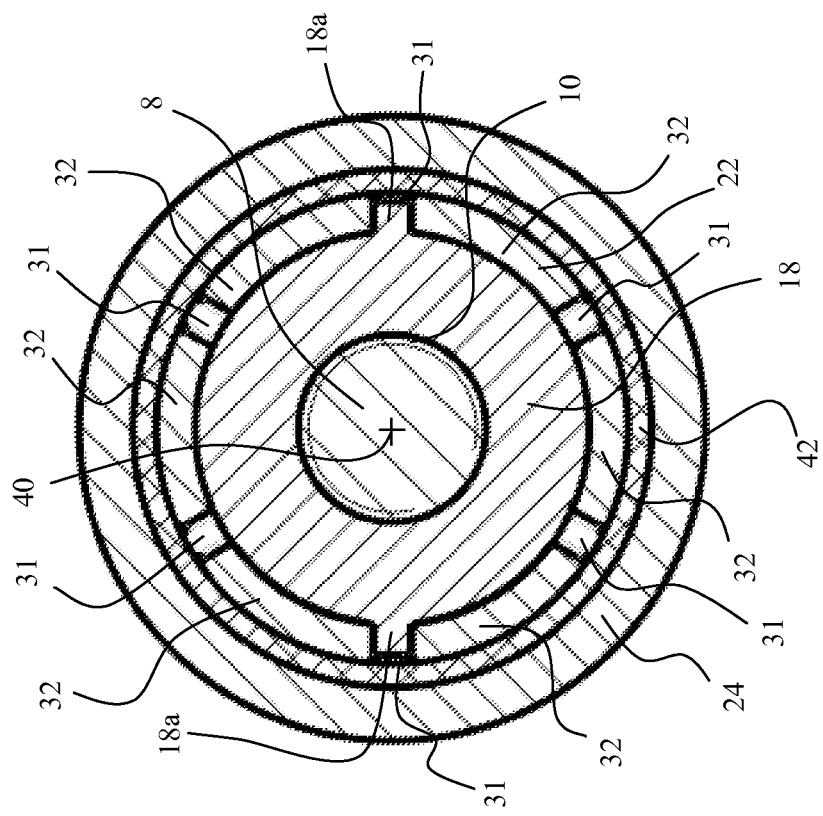
FIG. 3 is a cross section view along line A-A of FIG. 2.
Figure 4:
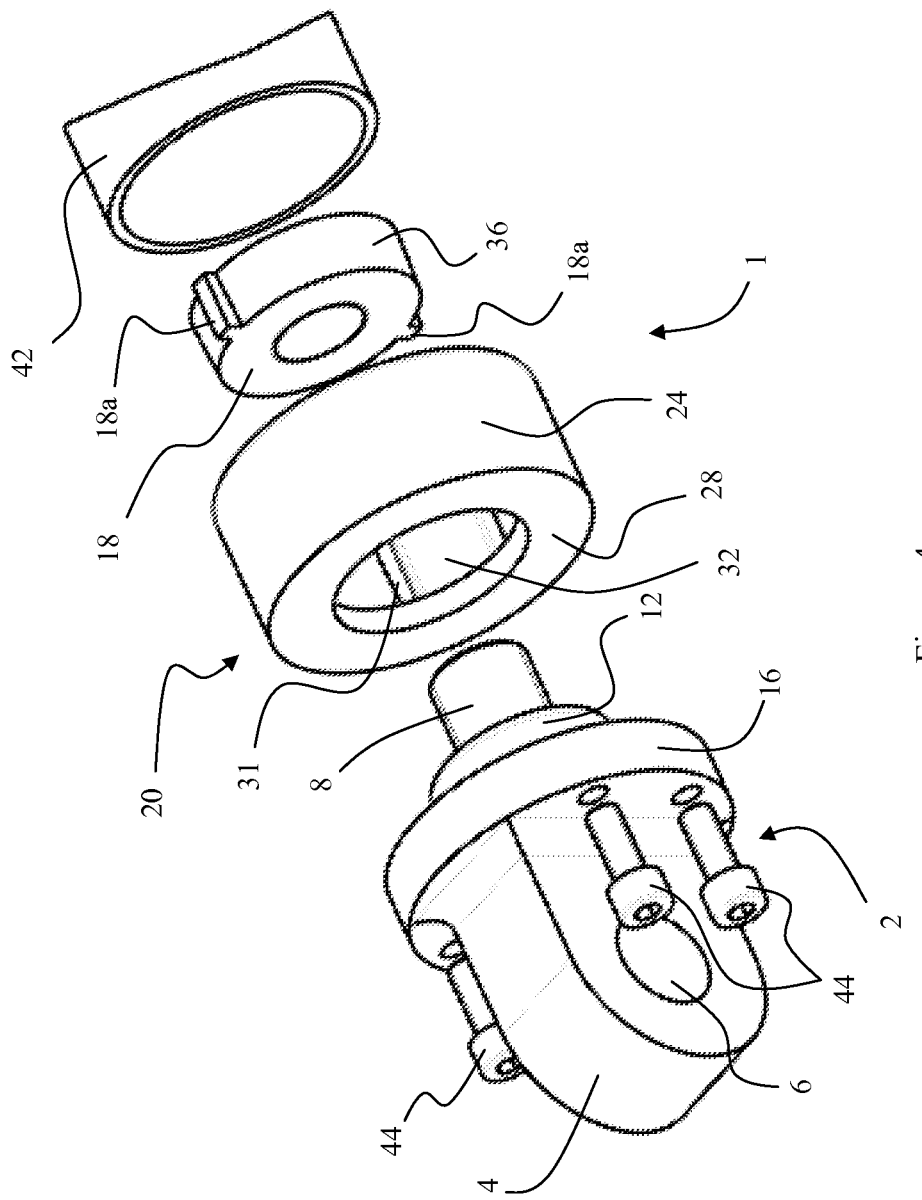
FIG. 4 is an exploded perspective view of the part of the torque transfer strut of FIG. 1.

FIGS. 1, 2, and 3 show an assembled torque transfer strut 1. The torque transfer strut 1 is typically assembled at ambient temperature.

To assemble the torque transfer strut 1, the clamping wedge 18 is inserted into the annular clamping member 20 with the radial splines or key members 18a received in correspondingly aligned axial slots 31 as shown in FIG. 3. The clamping wedge 18 is then loosely screwed onto the end part 8 of the end housing 2 by relative rotation between the end housing and the annular clamping member 20. The annular clamping member 20 is loosely received on the intermediate part 12 of the end housing 2 as shown in FIG. 2.

The end of the composite tube 42 is received in the annular channel 26.

Relative rotation between the end housing 2 and the annular clamping member 20 causes the clamping wedge 18 to move along the screw-threaded end part 8 of the end housing 2 in a first axial direction indicated by the arrow D. It will be readily appreciated that the clamping wedge 18 cannot rotate relative to the annular clamping member 20 because the radial splines or key members 18a are received in the axial slots 31 and they slide within the axial slots as the clamping wedge 18 moves in the first axial direction. The movement of the clamping wedge 18 along the inclined sliding contact surface 38 applies a progressively increasing radial force to the radially inner member 22 of the annular clamping member 20. The axial fingers 32 of the radially inner member 22 are deflected radially outwardly by the clamping wedge 18 and apply a radial clamping force to the first end of the composite tube 42. The composite tube 42 is therefore securely clamped between the radially inner and outer members 22, 24 of the annular clamping member 20 such that the end housing 2 is secured to the composite tube.

Relative rotation between the end housing 2 and the annular clamping member 20 is stopped when the desired radial clamping force is applied by the annular clamping member 20. Four bolts 44 are received in screw-threaded openings in the radially outer flange part 16 of the end housing 2 with their non-driven ends in abutment with the base part 28 of the annular clamping member 20 as shown in FIGS. 1 and 2. The bolts 44 prevent any further relative rotation between the end housing 2 and the annular clamping member 20. The base part 28 of the annular clamping member 20 is spaced apart from the radially outer flange 16 of the end housing by an axial gap or space 46 which is determined by the bolts 44. In other words, the bolts 44 can be used to adjust the axial position of the annular clamping member 20 relative to the connector part 4 of the end housing 2. The bolts 44 can be rotated using a suitable tool or driver to adjust this axial gap or space 46 so that the overall axial length of the torque transfer strut 1 meets specified design tolerances. For example, the bolts 44 can be rotated in a first sense to increase the axial gap or space 46 (i.e. to move the annular clamping member 20 further away from the connector part 4 of the end housing 2) to increase the overall axial length of the torque transfer strut 1 or vice versa.

When the end of the torque transfer strut 1 is cooled, e.g. to a cryogenic temperature, then the end housing 2 will shrink. The annular clamping member 20 will also shrink but typically to a lesser extent because it has a lower coefficient of thermal expansion. The shrinkage of the end housing 2 in the axial direction causes the clamping wedge 18 to move in the first axial direction relative to the annular clamping member 20. The clamping wedge 18 will slide further along the inclined contact surface 38 to increase the radial force that is applied to the radially inner member 22 of the annular clamping member 20. The radial clamping force that is applied in turn by the annular clamping member 20 to the composite tube 42 will remain substantially constant (the increase in the radial force applied by the clamping wedge 18 merely compensates for any reduction in the applied radial clamping force caused by the components shrinking at different rates) or may even increase slightly (the increase in the radial force applied by the applied by the clamping wedge exceeds any reduction in the applied radial clamping force caused by the components shrinking at different rates).

Figure 5:
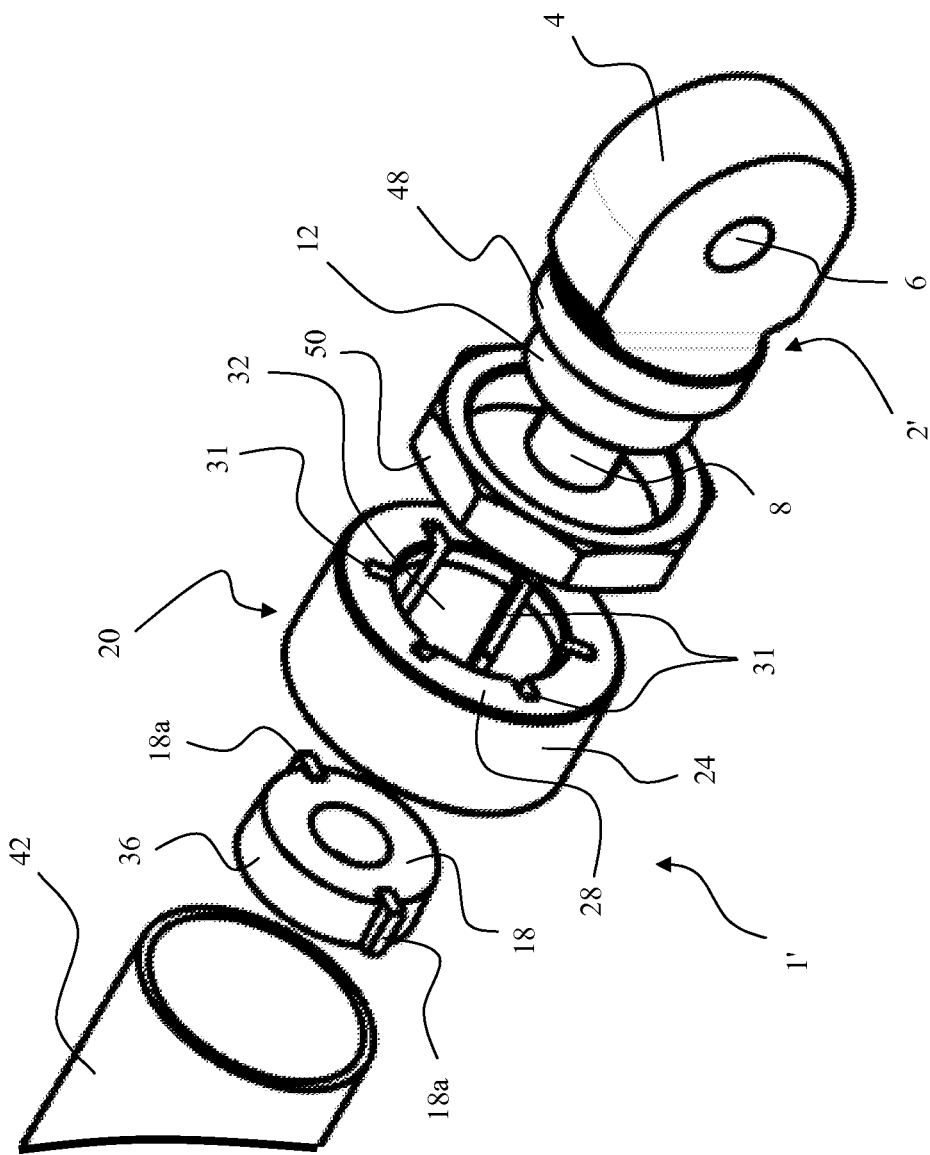
FIG. 5 is an exploded perspective view of part of an alternative torque transfer strut 1' with an adjustment nut.

An alternative torque transfer strut 1' is shown in FIG. 5. The torque transfer strut 1' is generally similar to the torque transfer strut 1 shown in FIGS. 1 to 4 and like parts have been given the same reference numeral.

The torque transfer strut 1' has a different end housing 2'. Instead of the radially outer flange part 16, the end housing 2' includes an externally screw-threaded part 48. An internally screw-threaded adjustment nut 50 is made of stainless steel and is screwed onto the screw-threaded part 48. The adjustment nut 50 is in abutment with the base part 28 of the annular clamping member 20 and positions it relative to the connector part 4 of the end housing 2'. The adjustment nut 50 prevents further rotation between the end housing 2' and the annular clamping member 20 and can also be used to adjust the overall axial length of the torque transfer strut 1' to meet specified design tolerances. For example, the adjustment nut 50 can be rotated in a first sense to move the annular clamping member 20 further away from the connector part 4 of the end housing 2' to increase the overall axial length of the torque transfer strut 1' or vice versa.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mechanical assembly, comprising:
   an elongated member having a first end; and
   a clamping fitting to apply an outward radial clamping force to the first end of the elongated member when the mechanical assembly is at an ambient temperature, the clamping member including:
     an annular clamping member composed of a material having a first coefficient of thermal expansion, with at least an inner member thereof secured to secured to the first end of the elongated member;
     an end housing operatively coupled to the annular clamping member, and composed of a material having a second coefficient of thermal expansion different than the first coefficient of thermal expansion; and
     a clamping wedge secured to the end housing such that an outer surface thereof is slidably engaged with the inner member of the annular clamping member,
   wherein when the mechanical assembly is cooled below ambient temperature, shrinkage of the end housing in the axial direction due to cooling causes the clamping wedge to move towards the first end, thereby pressing the inner member of the clamping member outward so as to substantially maintain or increase the radial clamping force that the clamping fitting applies to the first end of the elongated member.

2. The mechanical assembly according to claim 1, wherein the elongated member is a tube made of a composite material.

3. The mechanical assembly according to claim 1, wherein the annular clamping member comprises a radially inner member and a radially outer member spaced apart in a radial direction to define an annular channel into which the first end of the elongated member is received.

4. The mechanical assembly according to claim 3, wherein the radially inner member comprises a plurality of circumferentially-spaced axial slots that extend from a base part of the annular clamping member and define a plurality of circumferentially-spaced axial fingers.

5. The mechanical assembly according to claim 1, wherein the end housing comprises a connector part that allows the mechanical assembly to be connected to another component.

6. The mechanical assembly according to claim 1, wherein the end housing comprises a screw-threaded part.

7. The mechanical assembly according to claim 6, wherein the clamping wedge has a complementary internal screw thread to be screwed onto the screw-threaded part of the end housing.

8. The mechanical assembly according to claim 7, wherein the clamping wedge is sized and shaped to be a contact fit within an open annular end of the inner member of the annular clamping member.

9. The mechanical assembly according to claim 7, wherein one or both of the outer surface of the clamping wedge and an inner surface of the annular clamping member are angled relative to a longitudinal axis of the mechanical assembly such that the clamping wedge applies a progressively increasing radial force to the inner member of the annular clamping member as the clamping wedge moves in a first axial direction relative to the annular clamping member.

10. The mechanical assembly according to claim 9, wherein the clamping fitting is configured such that when the mechanical assembly is cooled, shrinkage of the end housing causes the clamping wedge to move in the first axial direction relative to the annular clamping member to apply a progressively increasing radial force to the inner member of the annular clamping member.

11. The mechanical assembly according to claim 1, further comprising one or more bolts received in internally screw-threaded openings in the end housing or an adjustment nut screwed onto an externally screw-threaded part of the end housing.

12. The mechanical assembly according to claim 1, being a torque transfer strut for a superconducting rotating electrical machine.

13. A method of using a mechanical fitting, the method comprising:
   providing a mechanical assembly according to claim 1 at ambient temperature;
   selectively adjusting the clamping fitting to apply a radial clamping force to the first end of the elongated member to secure the clamping fitting to the first end of the elongated member; and cooling the mechanical assembly to below to ambient temperature.

14. The method according to claim 13, wherein cooling the mechanical assembly comprises cooling the mechanical assembly to a cryogenic temperature.

15. A mechanical assembly, comprising:
an elongated member; and
a clamping fitting to apply a clamping force to the elongated member when the mechanical assembly is at an ambient temperature, the clamping member including:
  a clamping member having an inner member and an outer member spaced apart in a radial direction to define an annular channel into which the elongated member is received, the clamping member being composed of a material having a first coefficient of thermal expansion;
  an end housing operatively coupled to the clamping member, and composed of a material having a second coefficient of thermal expansion different than the first coefficient of thermal expansion; and
  a clamping wedge secured to the end housing such that an outer surface thereof is slidably engaged with the inner member of the clamping member,
wherein when the mechanical assembly is cooled below ambient temperature, shrinkage of the end housing in an axial direction due to cooling causes the clamping wedge to move towards the elongated member, thereby pressing the inner member of the clamping member outward so as to substantially maintain or increase the clamping force that the clamping fitting applies to the elongated member.

\* \* \* \* \*